(12) United States Patent
Borkgren et al.

(10) Patent No.: US 9,560,796 B1
(45) Date of Patent: Feb. 7, 2017

(54) HOPPER SLIDING 4-BAR DEPLOYMENT SYSTEM

(71) Applicant: Deere & Company, Moline, IL (US)

(72) Inventors: Stanley R. Borkgren, Geneseo, IL (US); Leonel O. Castillo, Monterrey (MX)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/873,535

(22) Filed: Oct. 2, 2015

(51) Int. Cl.
| | |
|---|---|
| *B65G 21/10* | (2006.01) |
| *A01C 15/00* | (2006.01) |
| *B65G 11/00* | (2006.01) |
| *B65G 41/00* | (2006.01) |

(52) U.S. Cl.
CPC .......... *A01C 15/006* (2013.01); *A01C 15/003* (2013.01); *B65G 11/00* (2013.01); *B65G 41/002* (2013.01)

(58) Field of Classification Search
CPC ..................................................... B65G 41/02
USPC ......... 198/581, 584, 550.2, 312, 313, 861.1, 198/861.2
See application file for complete search history.

(56) References Cited

U.S. PATENT DOCUMENTS

| | | | | |
|---|---|---|---|---|
| 3,752,410 A | * | 8/1973 | Dienst ..................... | B02C 13/28 241/189.1 |
| 4,102,012 A | * | 7/1978 | Davis ...................... | E05D 15/44 16/344 |
| 4,989,917 A | * | 2/1991 | Schmidt, Jr. ............. | B60P 1/34 298/10 |
| 8,714,344 B2 | | 5/2014 | Kowalchuk et al. | |
| 2004/0071537 A1 | * | 4/2004 | Pruteanu .................. | B65F 3/00 414/525.2 |
| 2006/0150584 A1 | * | 7/2006 | Weiss ................... | A01B 69/008 54/10 |

* cited by examiner

*Primary Examiner* — Gene Crawford
*Assistant Examiner* — Lester Rushin
(74) *Attorney, Agent, or Firm* — Joseph R. Kelly; Kelly, Holt & Christenson, PLLC (57) ABSTRACT

A hopper configuration comprises a hopper tray configured to receive a material from a source. The hopper configuration also comprises a conveyance mechanism configured to transport the received material from the hopper tray. The hopper configuration also comprises a first bar pivotably coupled to the hopper tray at a first point and also pivotably coupled to the conveyance mechanism at a second connection point. The hopper configuration further comprises a second bar pivotably coupled to the hopper tray at a third connection point and also pivotably coupled to the conveyance mechanism at a fourth connection point. Each of the connection points comprises a pivot point that substantially limits movement of the first and second bar to movement in a rotational direction.

18 Claims, 8 Drawing Sheets

HOPPER SLIDING 4-BAR DEPLOYMENT SYSTEM

FILED OF THE DESCRIPTION

The present disclosure relates to hopper deployment systems. More specifically, the present disclosure relates to a hopper deployment systems.

BACKGROUND

An agriculture commodity cart, or any other agricultural or other vehicle may comprise one or more tanks that carry a variety of products. An agricultural cart may also have conveyor mounted somewhere along the cart for transferring agricultural product, for example, between transport vehicles and storage vessels. It may be more convenient to mount a conveyor on the cart directly, rather than on a transport vehicle, or maneuver a portable conveyor as a separate implement.

A conveyor is typically installed with a deployment mechanism that allows it to be moved from a transport position to an operating position. The deployment mechanism may also allow the conveyor to be maneuvered so that a spout or an upper discharge end of the conveyor can be maneuvered to direct the commodity from the conveyor into a receiving vessel. Cart loading conveyors commonly include a hopper at an intake end.

The discussion above is merely provided for general background information and is not intended to be used as an aid in determining the scope of the claimed subject matter.

SUMMARY

A hopper configuration comprises a hopper tray configured to receive a material from a source. The hopper configuration also comprises a conveyance mechanism configured to transport the received material from the hopper tray. The hopper configuration also comprises a first bar pivotably coupled to the hopper tray at a first point and also pivotably coupled to the conveyance mechanism at a second connection point. The hopper configuration further comprises a second bar pivotably coupled to the hopper tray at a third connection point and also pivotably coupled to the conveyance mechanism at a fourth connection point. Each of the connection points comprises a pivot point that substantially limits movement of the first and second bar to movement in a rotational direction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
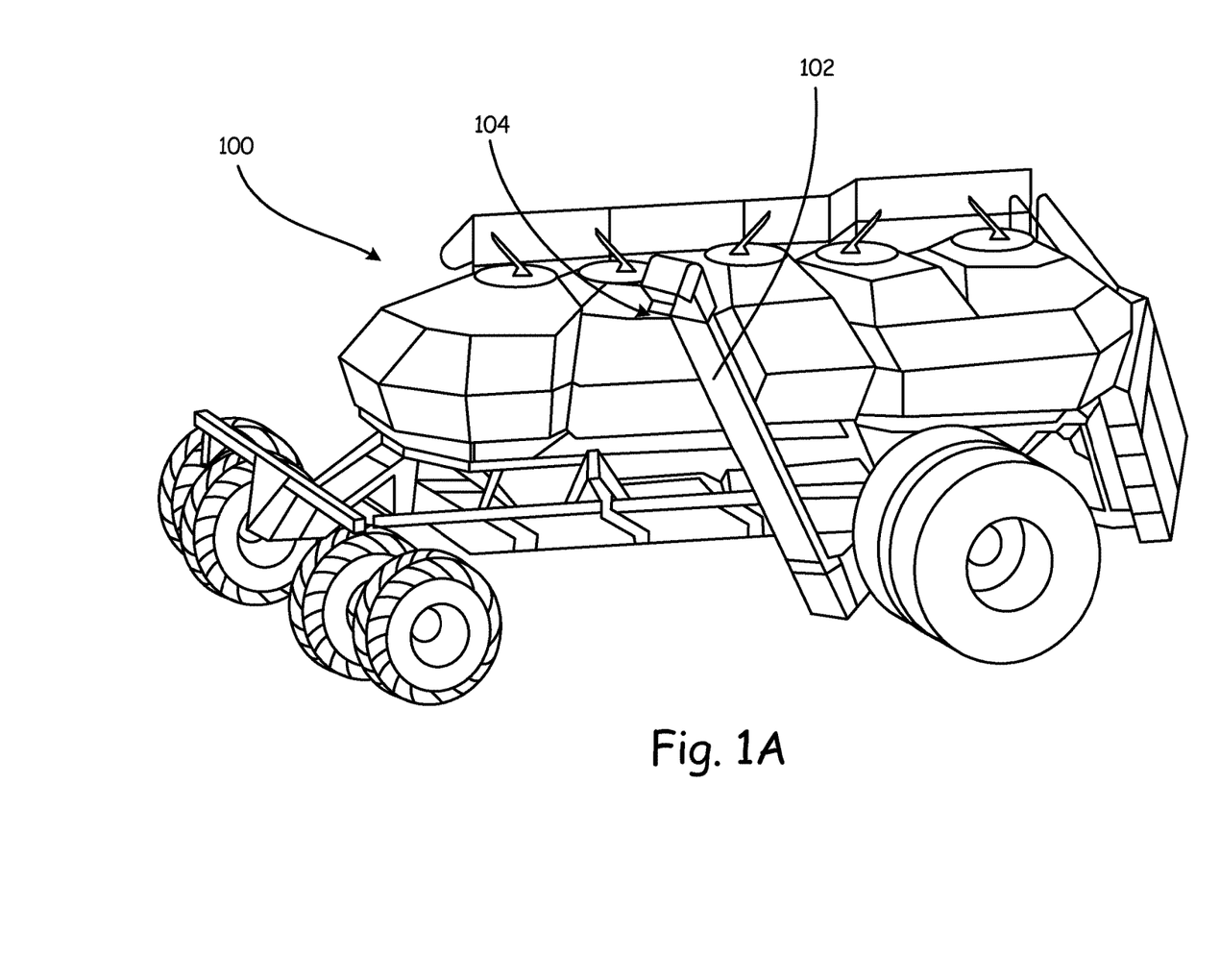
FIGS. 1A-1C illustrate an exemplary commodity cart with a hopper configuration that may be useful in accordance with one embodiment of the present invention.
Figure 1B:
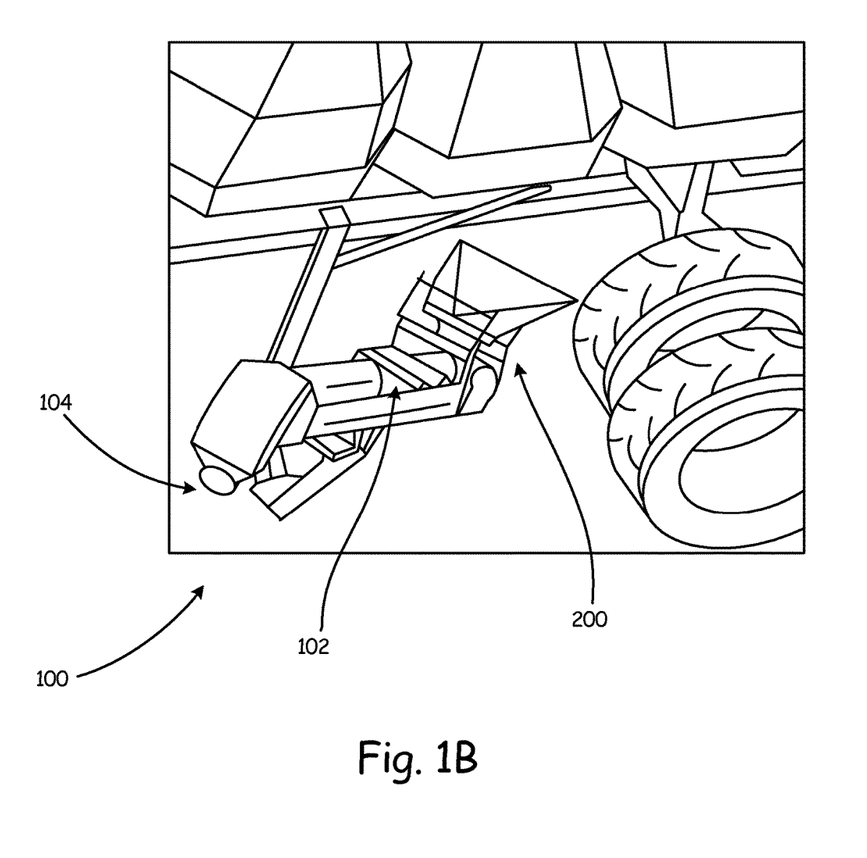
Figure 1C:
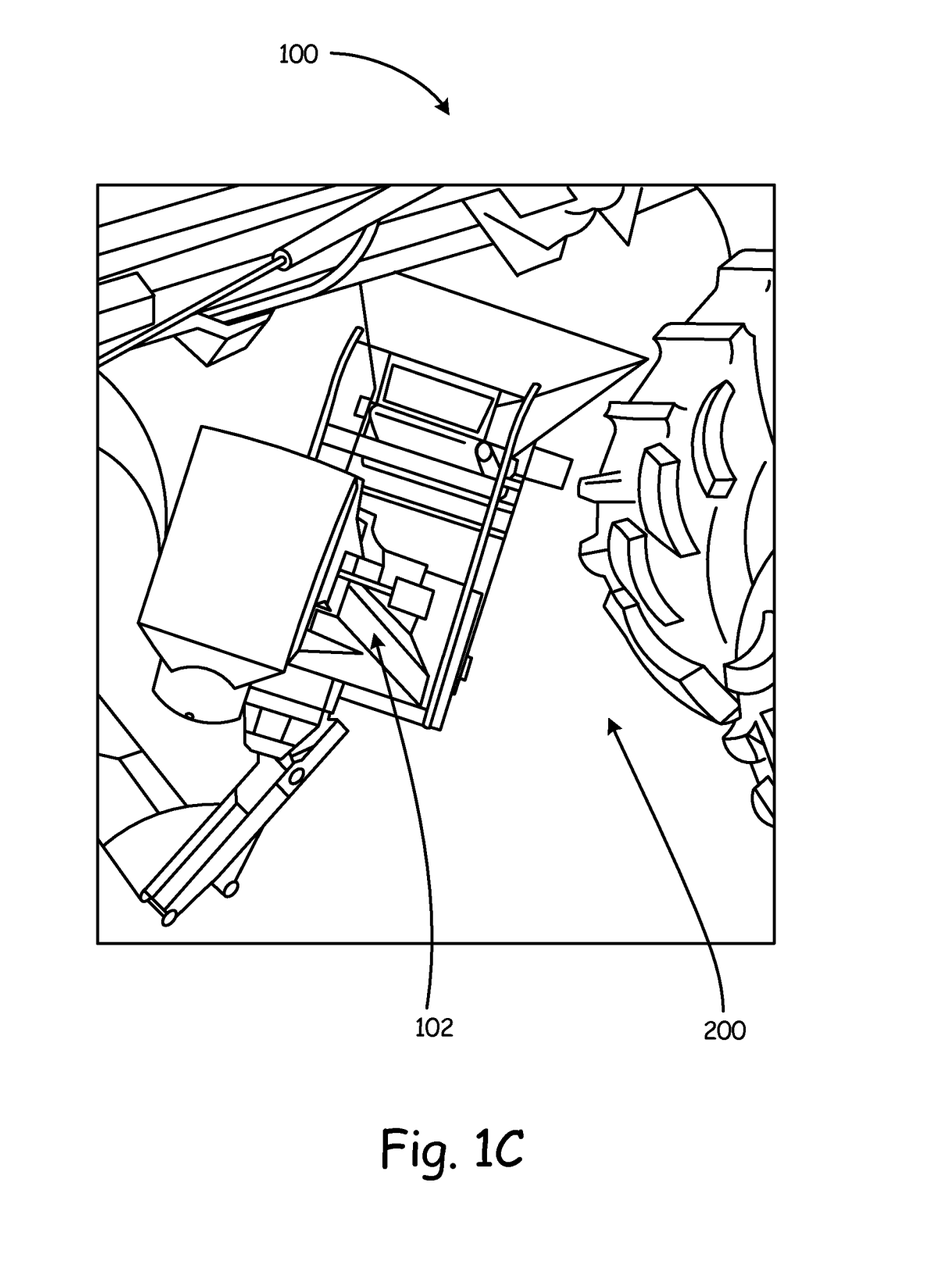

FIGS. 1A-1C illustrate an exemplary commodity cart with a hopper configuration that may be useful in accordance with one embodiment of the present invention. FIG. 1A illustrates one embodiment of a conveyance system on a commodity cart 100. The conveyance system may comprise, in one embodiment, a conveyance mechanism 102 with an outlet 104. In one embodiment, the conveyance mechanism 102 is a conveyor configured to receive material from a hopper and move the material up the conveyor 102 to an outlet 104. However, while FIGS. 1A-1C illustrate a conveyor 102 as the exemplary conveyance mechanism, another appropriate mechanism could be used, such as, for example, an auger. Additionally, although FIGS. 1A-C illustrate a commodity cart 100, it is to be understood that embodiments described herein can be practiced on any vehicle on which a hopper system would be appropriate. For example, embodiments may also be useful in a harvester, a tractor, or another exemplary collection and storage vehicle. The vehicle 100 may comprise, in one embodiment, one or more storage tanks as shown in FIG. 1A.

FIG. 1B illustrates an exemplary vehicle 100 with a conveyor 102 with material outlet 104 on a first end, and a hopper configuration 200 at a second end opposite the outlet 104. The hopper configuration 200 is configured to be maneuverable such that that the conveyor 102 can access a wider area range beneath and around the undercarriage of the vehicle 100.

FIG. 1C illustrates an exemplary hopper configuration 200 maneuvering underneath and around one or more wheels of the vehicle 100. Previous hopper deployment designs have used either a folding or sliding design, implemented on a conveyor with mounted tracks. One advantage of utilizing a hopper configuration 200 is that it allows less space to deploy and retract the hopper configuration 200 as compared to the previously-used folding designs. Use of hopper configuration 200 may also allow for the use of fewer parts and have an overall system that is lighter in weight, yet more robust than previously-used sliding hopper systems.

While a conveyor 102 is shown in FIGS. 1A-1C as the delivery mechanism in one embodiment, embodiments described herein can be practiced with an auger as the delivery mechanism from the hopper configuration 200 to the outlet 104. Additionally, while the conveyance system 102 shown in FIGS. 1A-1C is a conveyor-based system, it is to be understood that a conveyance system could also incorporate a hydraulic-based system, a belt-based system or could deliver material through a vibration-assisted mechanism.

Figure 2A:
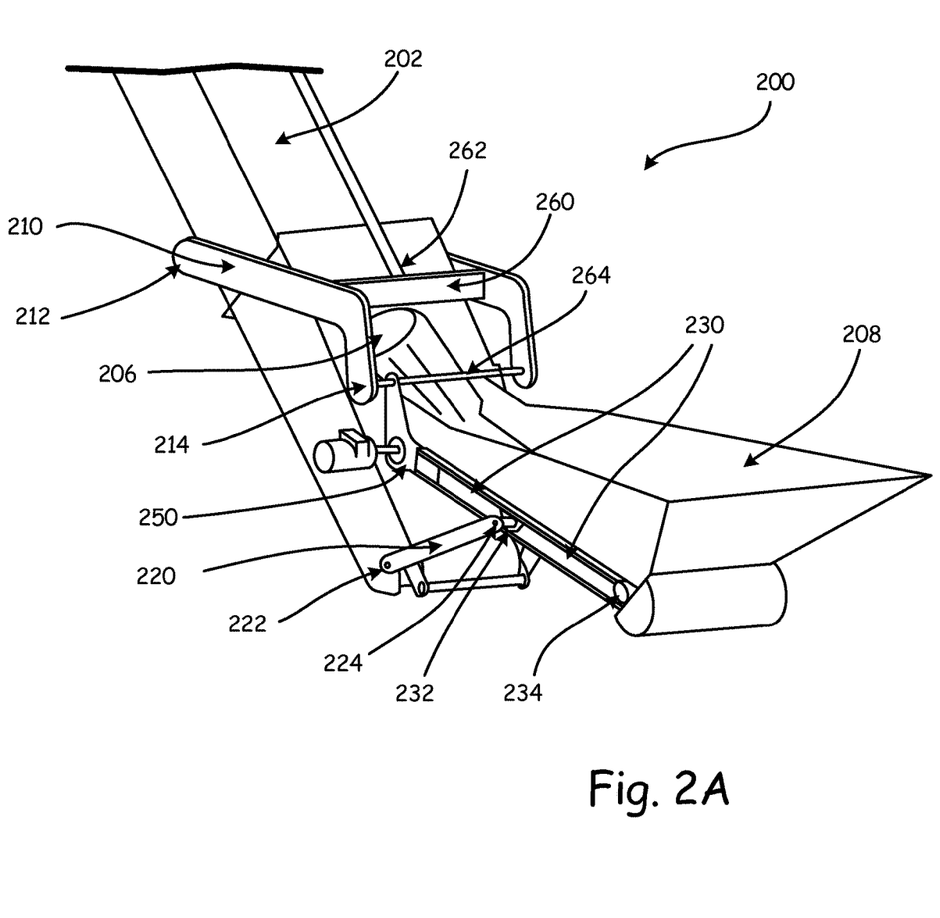
FIGS. 2A and 2B illustrate an exemplary hopper configuration that may be useful in accordance with one embodiment of the present invention.
Figure 2B:
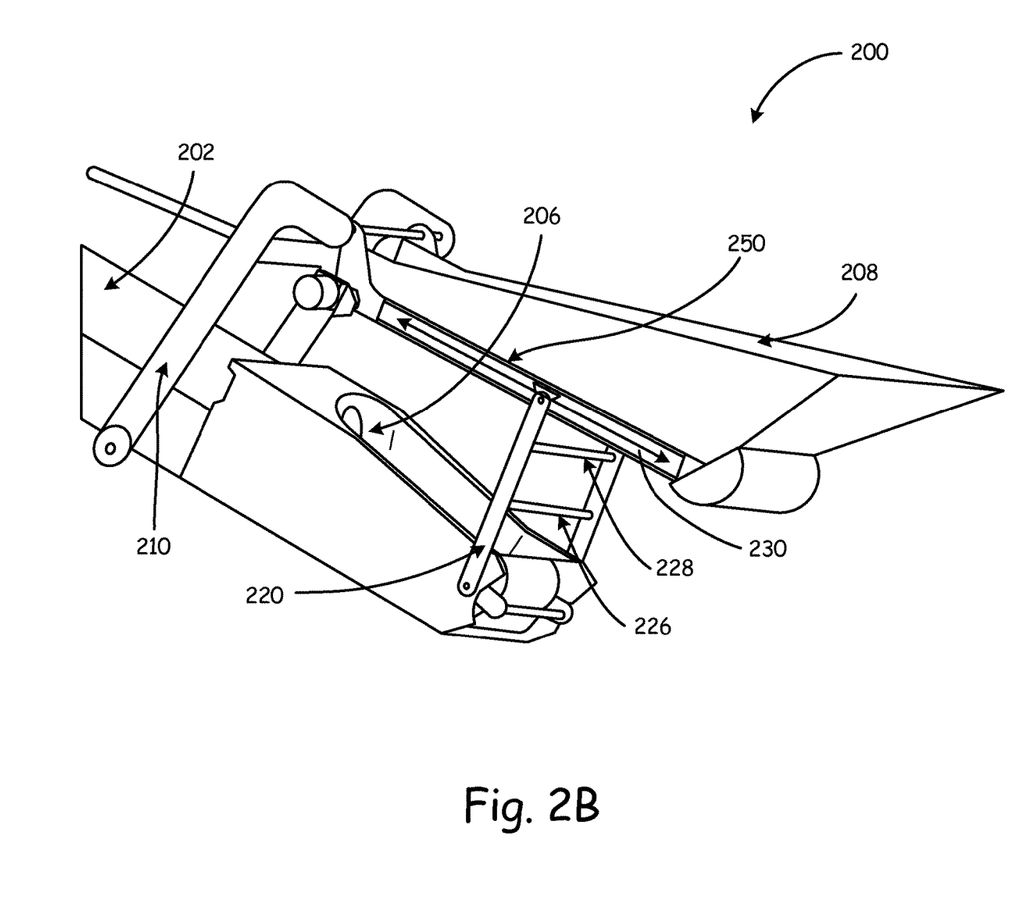

FIGS. 2A and 2B illustrate an exemplary hopper configuration that may be useful in accordance with one embodiment. Hopper configuration 200 is configured to be attached to an exemplary conveyor 202, with inlet 206. However, hopper configuration 200 could also be attached to any other appropriate delivery system, for example an auger. The conveyor inlet 206 may also comprise a shield such that foreign debris or material is not easily picked up by the conveyor 202. The shield may be a removeable shield such that, during storage, it completely covers the inlet 206 and, during deployment, it only partially covers the inlet 206. The hopper configuration 200 may also comprise a hopper skirt 208 configured to sit within a hopper tray 250. In a deployed position, the hopper tray 250 and hopper skirt 208 are located at a position below the conveyor inlet 206. In a storage position, in one embodiment, the hopper tray 250 may rest in a position substantially parallel to, and above, conveyor 202. In the deployed position, in one embodiment, hopper tray 250 may occupy a position substantially angled with respect to the conveyor 202.

In one embodiment, the hopper skirt 208 is composed of a flexible material. For example, skirt 208 can be composed of synthetic or natural rubber. However, another material, for example any polymer-based plastic material, or, for example, any lightweight metal could be used to comprise the skirt 208. In one embodiment, the entire hopper configuration 200 is composed of light-weight materials selected to eliminate excess weight. For example, the hopper skirt 208 could be constructed from aluminum. Additionally, other materials could be incorporated into part or all of the hopper configuration 200, for example a Kevlar® composite, epoxy composite, carbon fiber or a carbon fiber composite, or a glass-fiber composite could be used as the material for any of the upper bars 210, lower bars 220, hopper tray 250, and/or hopper skirt 208. In one embodiment, the hopper tray 250 comprises a different material than the hopper skirt 208. In one embodiment, the hopper tray 250 comprises a light-weight metal, for example, aluminum.

In one embodiment, the hopper configuration 200 facilitates removal of excess weight by eliminating the mounted tracks required for previously-used sliding hopper systems, which hopper configuration is moved into place by sliding the hopper configuration on the mounted tracks. Instead, exemplary hopper configuration 200 exhibits a partially sliding, partially dropping motion defined by a plurality of pivoting connections as it moves between storage and deployed positions. In one embodiment, the hopper configuration 200 includes upper arms 210 and lower arms 220, each pivotably connected to both the conveyor 202 and the hopper tray 250. In one embodiment, each of an upper arm 210 and a lower arm 220 is located on either side of the hopper skirt 208 such that the hopper 200 is connected to the conveyor 202 at four connection points, corresponding to each of two upper bars 210 and two lower bars 220. However, in another embodiment, only a single upper arm 210 and lower arm 220 are utilized, such that the hopper is connected to the conveyor 202 at two connection points, where the two connection points may be on the same side, or opposing sides, of the configuration 200.

A hopper configuration needs to be compact during storage and transport, but also able to deploy quickly and effectively once on a job site. The hopper configuration 200 may be configured to enable a movement that is neither explicitly sliding nor explicitly folding, but instead involves rotation around a plurality of pivot points. Rotation of the upper and lower bars 210 and 220, respectively, around the plurality of pivot points, allows the hopper configuration 200, in one embodiment, to partially slide and partially drop down into position below an inlet 206 of conveyor 202. This hybrid motion may allow for a more effective seal between the hopper 200 and the conveyor inlet 206. This presents an advantage over previous designs, which mainly fall into the categories of a sliding hopper configuration or a folding hopper configuration.

In one embodiment, the upper arm 210 is pivotably connected to the conveyor 202 at a conveyor connection point 212. In one embodiment, the upper arm conveyor connection point 212 allows for substantially only rotational movement of the upper arm 210 around connection point 212. Upper arms 210 may be connected by an upper arm connecting rod 264, in one embodiment. In one embodiment, upper arms 210 may not directly connect to the hopper tray 250, but may be coupled to the hopper tray 250 through connecting rod 264. In one embodiment, upper arm connecting rod 264 may be located on an opposite side of the hopper tray 250 from the conveyor 202, in a storage position. The upper arms 210 may also be connected, in one embodiment, by a stabilizing bar 260. The movement of the upper arms 210 may be triggered by an actuator 262. In one embodiment, the actuator 262 is a hydraulic actuator connected to the stabilizing bar 260. In one embodiment, the actuator 262 is an electric-based actuator. In another embodiment, the actuation mechanism 262 is physically connected to only one upper arm 210.

In one embodiment, the hopper is also pivotably connected to the conveyor 202 through lower arm 220, which is connected to the conveyor 102 at a lower arm conveyor connection point 222. In one embodiment, the lower arm conveyor connection point 222 allows for substantially only rotational movement of the lower arm 220 around connection point 222. In one embodiment, the upper arm conveyor connection point 212 is located downstream of the lower arm conveyor connection point 222, with respect to movement of material within the conveyor 202. In one embodiment, the upper arm 210 is pivotably connected to the hopper at an upper arm hopper connection point 214. In one embodiment, the lower arm 220 is also pivotably connected to the hopper at a lower arm hopper connection point 224. In one embodiment, the upper arm hopper connection point 214 is configured such that substantially only rotational movement is allowed.

In one embodiment, the lower arm 220 is also connected to the hopper tray 250 at hopper connection point 224. In one embodiment, lower arm hopper connection point 224 is not a fixed point, but comprises a movable connection along a hopper slide 230 such that, as the lower arm 220 moves, the connection point 224 moves along an axis defined by slide 230. In one embodiment, the hopper slide 230 comprises a continuum such that the lower arm 220, when connected to the hopper tray 250, can move relatively freely along an axis defined by the hopper slide 230, as shown in FIGS. 2A and 2B.

In one embodiment, however, the lower arm 220 may enter a fixed point on the axis defined by hopper slide 230 and remain in a fixed position by engaging a locking mechanism. The locking mechanism may comprise a lower arm lock portion 232 that engages with a hopper lock portion 234. In one embodiment, the locking mechanism is only present on one side of the hopper configuration 200, such that only one of the lower arms 220 is configured to lock into place. In another embodiment, each of the lower arms 220, present on either side of the hopper configuration 200, has a lower arm lock portion 232 configured to engage with a hopper lock portion 234 to lock the lower arm 220 into place at a position along the hopper slide 230. In one embodiment, hopper configuration 200 comprises a powered deployment system that allows the hopper configuration 200 to move between a storage position and a deployed position. In another embodiment, the powered deployment system is part of the conveyor 202.

FIG. 2B illustrates a substantially side view of hopper configuration 200. In one embodiment, the hopper configuration 200 comprises one or more guide rods positioned at different points along either the upper arms 210 or the lower arms 220, where each guide rod is configured to limit rotational movement of the hopper configuration 200. In one embodiment, the lower arm includes a lower guide 226 and an upper guide 228, wherein each of the guides 226 and 228 are configured to limit rotation of the lower arm 220. In one embodiment, the lower guide 226 is configured to contact the conveyor 202 while hopper configuration 200 is in a storage position. In one embodiment, upper guide 228 is configured to contact the hopper frame in the deployed position. The upper guide 228 may also be configured to ensure that a hopper tail 252 successfully clears the edge of the conveyor 202 during retraction to the storage position. In one embodiment, the upper guide 228 and lower guide 226 may be composed of the same material as the upper and lower arms 210 and 220, respectively. In one embodiment, the guides 226 and 228 may be manufactured as a single unit with the lower arms 220. In one embodiment, one or more of the guides 226 and 228 may be enclosed within a sleeve, in order to reduce friction. In one embodiment, only the upper guide 228 is enclosed within a sleeve. While the guide rods 226 and 228 are, illustratively, shown in FIGS. 2A and 2B as positioned on the lower rod 220, it is to be understood that they could also be positioned on the upper arm 210.

Figure 3:
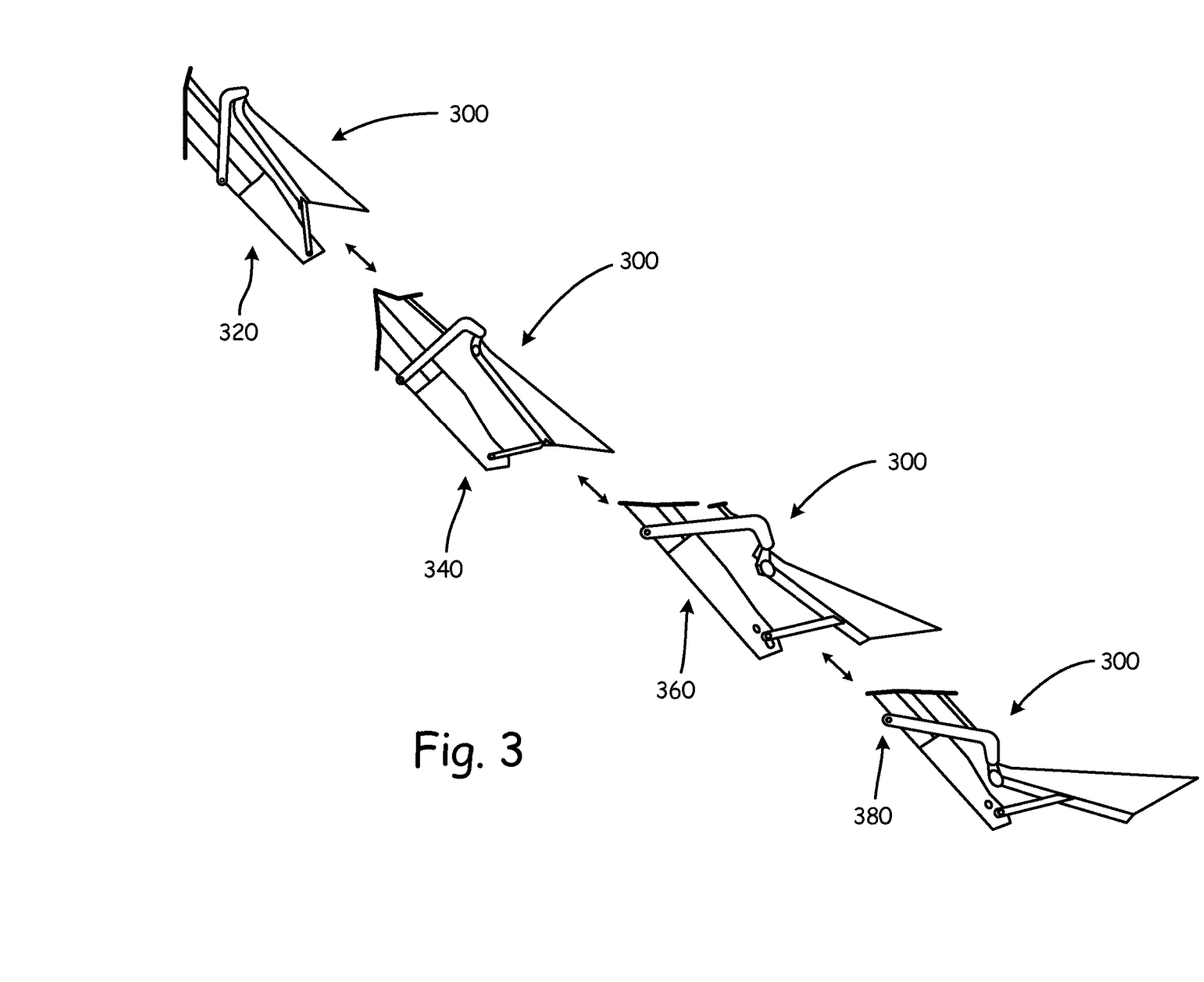
FIG. 3 illustrates an exemplary motion sequence for a hopper configuration in accordance with one embodiment of the present invention.

FIG. 3 illustrates an exemplary motion sequence for a hopper in accordance with one embodiment. While FIG. 3 illustrates four exemplary positions a hopper configuration 300 may pass through, including exemplary storage position 320 and exemplary deployed position 380, the hopper configuration 300 may be able to enter a locked position at discrete positions between the positions 320, 340, 360 and 380 shown in FIG. 3. Additionally, in another embodiment, the hopper configuration 300 may move through positions 320, 340, 360 and 380 without stopping at any discrete position. Additionally, while positions 320, 340, 360 and 380 are shown, it is to be understood that other positions may be available, based on the movement available by the upper arms 210 and the lower arms 220.

Position 320 may comprise an exemplary storage position for the hopper configuration 300. In position 320, the lower guide 226 may be substantially in contact with the conveyor 202. In its storage position, both upper arms 210 and lower arms 220 of the hopper configuration 300 may be at a first end of their rotation limits.

The hopper configuration 300, during deployment, may move through exemplary position 340 as the upper arms 210 and lower arms 220 rotate around their respective pivot points 212 and 222. In position 340, the lower arm 220 may be able to enter a locked position, as the lower arm lock portion 232 engages with the hopper lock portion 234. In one embodiment, the lower arm 220 may enter the locked position 340, at a substantially 90° angle with respect to the conveyor 202, in order to, for example, allow for the hopper configuration 300 to transition between the storage and deployed positions as the conveyor 202 moves into place. In another embodiment, the hopper configuration 300 passes through position 340 without engaging a locking mechanism.

Position 360 illustrates another exemplary transitional position that the hopper configuration 300 may pass through between storage and deployed configurations. In one embodiment, the lower arm 220 may continue to move as the lower arm hopper connection point 224 moves along slide 230. The freedom of the lower arm 220 to move along the axis defined by slide 230 may allow for the hopper tray 250 to extend downstream from a conveyor inlet 206.

In one embodiment, hopper configuration 300 is substantially deployed in position 380, as the upper guide 228 contacts the hopper tray 250, defining a second end of rotational movement allowed by the hopper configuration 300. However, in an embodiment where the lower arms 220 do not include one or more guides, the hopper configuration 300 may be configured to allow for motion beyond the position 380. Between the exemplary positions 360 and 380, the hopper tray 250 moves in a substantially vertical direction, dropping to a position below the conveyor inlet 206. The substantially vertical drop that takes place between positions 360 and 380 may allow, in one embodiment, for an improved seal geometry between the hopper configuration 300 and the conveyor 202, thus limiting spillage of material as compared to previously used sliding carriage hopper systems.

In one embodiment, as the hopper configuration 300 moves through exemplary positions 320, 340, 360 and 380, the upper arms 210 and lower arms 220 ensure that hopper configuration 300 maintains a sufficient distance to clear the end of conveyor 202 and then lowers the hopper configuration 300 vertically onto the conveyor 202. This motion may allow for a tube conveyor intake transition to be lowered at a hopper connection point thus reducing an incline angle of the hopper configuration 300. The lower incline angle of the hopper configuration 300 increases clearance under an exemplary vehicle, for example a trailer or a cart or vehicle 100, and increases conveyance capacity of the hopper configuration 300.

Figure 4:
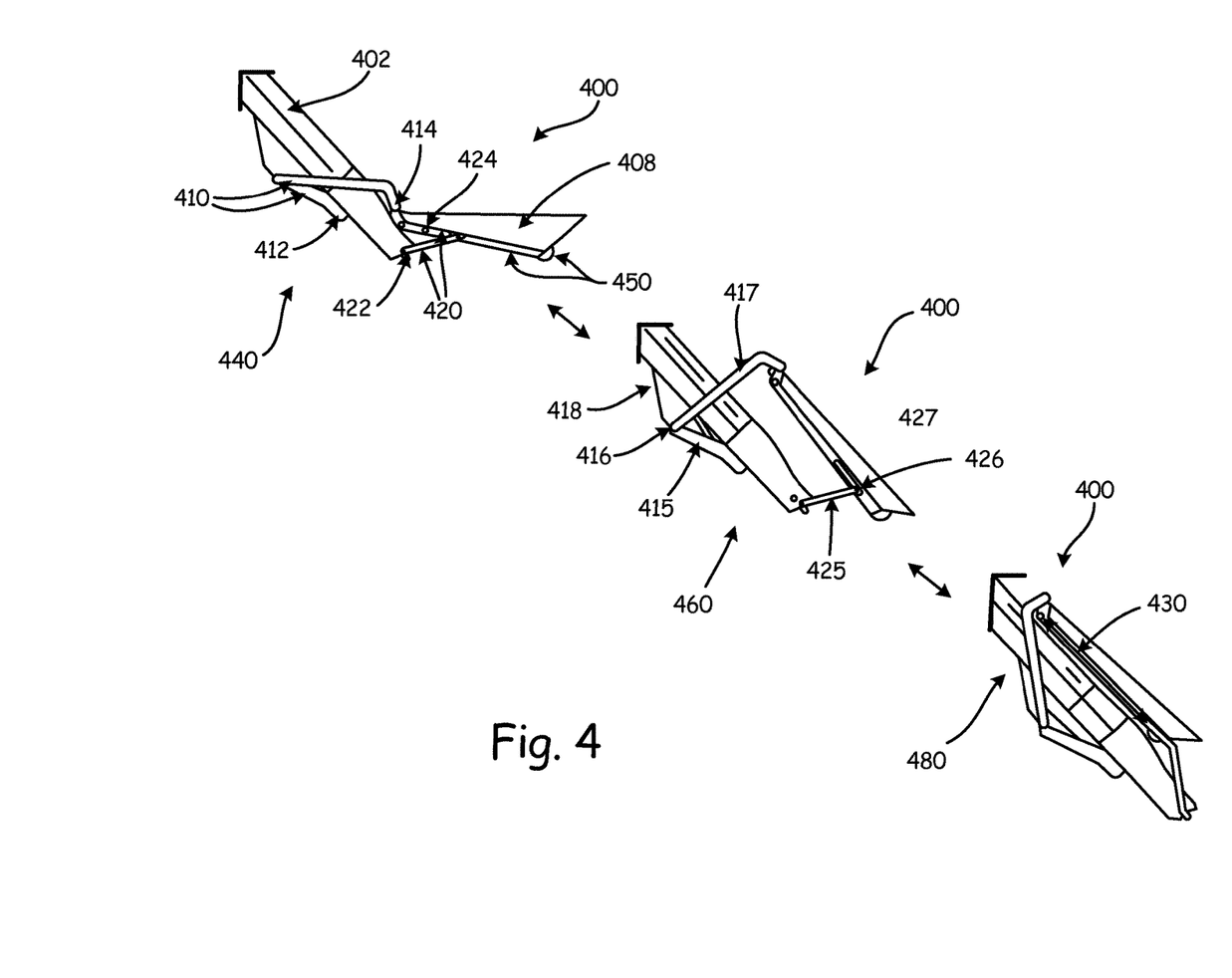
FIG. 4 illustrates a hopper configuration with internal pivot points for each arm that may be useful in accordance with one embodiment of the present invention.

FIG. 4 illustrates a hopper configuration with internal pivot points for each arm that may be useful in accordance with one embodiment of the present invention. Hopper configuration 400 may comprise, in one embodiment, a pair of upper arms 410 and lower arms 420. Each of the upper arms 410 and the lower arms 420 may comprise, as shown in one embodiment in FIG. 4, not only pivotable connection points to the hopper tray 450 and the conveyor 402, but may also include at least one internal pivot point. Hopper configuration 400 may move between exemplary positions 440, 460 and 480, where exemplary position 480 substantially comprises a storage position, and exemplary position 440 substantially comprises a deployed position.

The upper arm 410, in one embodiment, comprises an internal pivot point 416 connecting upper arm portion 415 and 417. In one embodiment, internal pivot point 416 is also fixedly connected to a handle 418 that engages the conveyor 402. As shown in FIG. 4, the handle 418 is substantially rigid, such that the portion 415 of the upper arm 410 is substantially fixed in place as the hopper configuration 400 moves between the storage and deployed positions. However, in another embodiment, handle 418 comprises a flexible material allowing for at least some movement of the portion 415 of the upper arm 410. In another embodiment, the hopper configuration 400 does not include handle 418, and both portions 415 and 417 of the upper arm 410 are configured to exhibit some freedom of movement as the hopper configuration 400 moves between storage and deployed positions.

In one embodiment, the lower arm 420 also comprises an internal pivot point 426, connecting lower arm portions 425 and 427. Portion 425, in one embodiment, is connected to the hopper tray 450 at a point along hopper slide 430 on one end, and internal pivot point 426 on the other end. Portion 427 comprises a bar connected to the conveyor 402 on one end, and internal pivot point 426 on the other end. Portion 425, in one embodiment, remains substantially parallel to the hopper tray 450 as the hopper configuration 400 moves between the storage position and the deployed position. Portion 425 may slide along a hopper slide 430 at connection point 424. In another embodiment, portion 425 does not maintain a fixed orientation, but exhibits some movement as the hopper configuration 400 moves between storage and deployed positions. In one embodiment, the lower arm 420 of configuration 400 may better support a hopper tail when in a deployed position than previously used sliding or folding hopper configurations.

In one embodiment, the additional range of movement is enabled by the addition of multiple pivot points may allow for a longer hopper frame 450 and hopper skirt 408 as part of the hopper configuration 400. This increased length may be enabled by the addition of upper arm internal pivot 416. Additionally, the one or more handles 418 are added to assist in controlling unwanted rotation of conveyor 402 during movement and use. The addition of pivot point 418 may also allow for a more compact storage position, for example as shown in position 480 of FIG. 4. The more compact storage position, in one embodiment, may allow for the portion 425 to comprise a shield that engages with, and substantially seals a conveyor inlet from unwanted debris during transport. In one embodiment, the shield may be composed of rubber. In another embodiment the gate comprises a plastic material. In a further embodiment, the shield may be composed of a thin metal flap, for example an aluminum sheet. In an embodiment where portion 425 comprises a shield, the shield may, in addition to covering the conveyor inlet during storage, may also coordinate rotation of the lower arm 220 between the storage and deployed positions, for example providing similar functionality to guides 226 and 228 in limiting rotation of the hopper configuration 400.

In one embodiment, portion 425 remains substantially parallel to the hopper slide 430 throughout movement of the hopper configuration 400 between storage and deployed positions. This may be achieved, in one embodiment, by use of a plurality of wheels or nylon slide limits that substantially prevent the hopper bar from rotating in relation to the hopper frame, for example as shown in greater detail in FIGS. 5A and 5B.

Figure 5A:
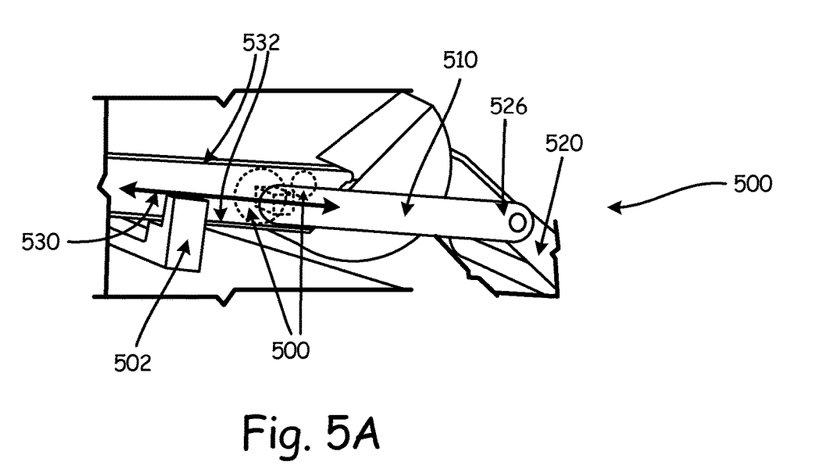
FIGS. 5A and 5B illustrate an exemplary locking mechanism for a hopper configuration that may be useful in accordance with one embodiment of the present invention.
Figure 5B:
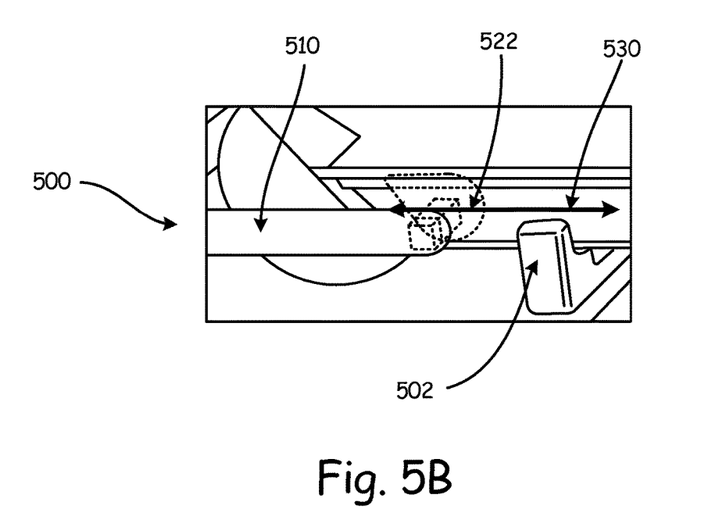

FIGS. 5A and 5B illustrate an exemplary locking mechanism for a hopper configuration that may be useful in accordance with one embodiment of the present invention. FIG. 5A illustrates a locking configuration 500 comprising a hopper bar 510 with a pivot connection point 526 that allows for a pivotable connection between the hopper bar 510 and a lower bar 520. In one embodiment, a wheel-lock configuration 512, shown in phantom in FIG. 5A, substantially prevents rotation of the hopper bar 510 during the movement of the hopper between storage and deployed positions. In one embodiment, the wheel-lock configuration 512 comprises at least two wheels connected substantially stored along a hopper slide 530. In one embodiment, the hopper slide 530 may comprise one or more ridges that comprise a track that allows for substantial movement in a horizontal direction along the hopper slide 530, but no movement in a vertical direction. In one embodiment, there is a ledge 532 on both edges of the hopper slide 530. In another embodiment, there is only a ledge 532 on the upper edge of the hopper slide 530, or only a ledge 532 on the lower edge of the hopper slide 530.

FIG. 5B illustrates an alternative configuration for a locking mechanism capable of holding the hopper bar 510 in a position parallel to the hopper slide 530. In one embodiment, the hopper bar 510 moves along a slide 530, with rotation substantially inhibited by a slide limit 522. In one embodiment, the slide limit 522 is substantially tear drop shaped. In one embodiment, the slide limit 522 comprises a plastic material. In one embodiment, the slide limit 522 comprises shaped nylon. In yet another embodiment, the slide limit is composed of metal. In one embodiment, the hopper configuration also comprises a hopper frame rest 502 that substantially engages with the hopper frame during transport and storage of a hopper configuration.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A hopper configuration comprising:
   a hopper tray configured to receive a material from a source;
   a conveyance mechanism configured to transport the received material from the hopper tray;
   a first bar pivotably coupled to the hopper tray at a first point and also pivotably coupled to the conveyance mechanism at a second connection point;
   a second bar pivotably coupled to the hopper tray at a third connection point and also pivotably coupled to the conveyance mechanism at a fourth connection point; and
   wherein each of the connection points comprises a pivot point that substantially limits movement of the first and second bar to movement in a rotational direction, and wherein rotation of the first bar and the second bar is further limited by a guide configured to engage the conveyance mechanism, in a storage position, and configured to engage the hopper tray, in a deployed position.

2. The hopper configuration of claim 1, wherein the hopper tray comprises an axis defined by a slide, wherein the slide runs along a length of the hopper tray, and wherein the third connection point comprises a moveable connection point along the slide.

3. The hopper configuration of claim 1, wherein the first bar and the second bar are positioned on a first side of the hopper tray, and further comprising:
   a third bar positioned substantially parallel to the first bar on a second, opposite side of the hopper tray, wherein the third bar is pivotably coupled to the hopper tray at a fifth connection point, wherein the fifth connection point is substantially opposite the first connection point, and also pivotably coupled to the hopper tray at a sixth connection point, wherein the sixth point is substantially opposite the second connection point; and
   a fourth bar positioned substantially parallel to the second bar on the second side of the hopper tray, wherein the fourth bar is pivotably coupled to the hopper tray at a seventh connection point, wherein the seventh connection point is substantially opposite the third connection point, and also pivotably coupled to the hopper tray at an eighth connection point, wherein the eighth connection point is substantially opposite the fourth connection point.

4. The hopper configuration of claim 2, wherein the slide comprises a continuum of positions.

5. The hopper configuration of claim 2, wherein the second bar is configured to enter a locked position on the slide, wherein the locked position is entered by a slide locking mechanism, located on the slide, engaging a bar locking mechanism located on the second bar.

6. The hopper configuration of claim 1, and further comprising:
a guide rod configured to limit rotation of the second bar.

7. The hopper configuration of claim 1, and further comprising:
a hopper skirt configured to fit within the hopper tray such that the received material is received by the hopper skirt; and
wherein the hopper skirt is composed of a different material than the hopper tray.

8. A deployment system for a hopper, wherein the deployment system is configured to move the hopper between a storage position and a deployed position, the system comprising:
a hopper tray;
a conveyance system:
an upper bar configured to pivotably connect to the conveyance system on a first end and pivotably connect to the hopper tray on a second end:
a lower bar configured to pivotably connect to the conveyance system on a first end and pivotably connect to the hopper tray on a second end;
wherein the movement of the hopper tray between the storage position and the deployed position is defined by the rotation of the upper and lower bars such that in the storage position, the hopper tray comprises a position substantially parallel to the conveyance system and, in the deployed position, comprises an angled position with respect to the conveyance system; and
wherein the rotation of the upper bar and lower bar is further limited by a guide configured to engage the conveyance system in the storage position and configured to engage the hopper tray in the deployed postion.

9. The deployment system of claim 8, wherein the pivotable connection between the lower bar and the hopper tray comprises a semi-fixed connection wherein the lower bar is moveable along an axis comprising substantially the length of the hopper tray and wherein movement of the lower bar along the axis changes the angled position of the hopper tray with respect to the conveyance system.

10. The deployment system of claim 8, and further comprising:
wherein the hopper tray has a first end and a second end, and wherein the conveyance system has an inlet end;
wherein, in the storage position, the first and second ends of the hopper tray are above the conveyance system, and a bottom of the hopper tray is substantially parallel to the conveyance system; and
wherein, in the deployment position, the first end of the of the hopper tray is substantially aligned with the inlet end of the conveyance system.

11. The deployment system of claim 10, wherein, in the storage position, the second end of the hopper tray is substantially above the conveyor inlet.

12. The deployment system of claim 8, wherein the guide comprises a first limiting rod and a second limiting rod, wherein the first and second limiting rods are connected to the lower bar, and wherein the first limiting rod is configured to engage the conveyance system in the storage position and the second limiting rod is configured to engage the hopper tray in the deployed position.

13. The deployment system of claim 8, wherein the guide comprises a first limiting rod and a second limiting rod, wherein the first and second limiting rod arc connected to the upper bar, and wherein the first limiting rod is configured to engage the conveyance system in the storage position and the second limiting rod is configured to engage the hopper tray in the deployed position.

14. A conveyor system configured to receive and transport a material, the system comprising:
a conveyance mechanism with an inlet configured to receive the material, and an outlet configured to deliver the material; and
a hopper associated with the conveyance mechanism and configured to move between a storage position and a deployed position, wherein the hopper comprises:
an upper bar pivotably connected to the conveyance mechanism at an upper pivot point, and pivotably connected to a hopper tray; and
a lower bar pivotably connected to the conveyance mechanism at a lower pivot point, and pivotably connected to the hopper tray such that the lower bar is configured to move along an axis comprising substantially the length of the hopper tray, the lower bar further comprising:
a rotating portion that is pivotably connected to the conveyance mechanism;
a fixed portion that is pivotably connected to the hopper tray;
an internal pivot point that connects the rotating portion and the fixed portion; and
a locking mechanism configured to lock the fixed portion into a position substantially parallel to the axis, such that fixed portion maintains substantially the same position as the hopper tray moves between the storage position and the deployed position.

15. The conveyor system of claim 14, wherein the upper bar further comprises:
a rotating portion that is pivotably connected to the hopper tray;
a fixed portion that is pivotably connected to the conveyance mechanism;
an internal pivot point that connects the rotating portion and the fixed portion such that fixed portion maintains substantially the same position as the hopper tray moves between the storage position and the deployed position, and wherein movement of the hopper tray is facilitated by rotation of the rotating portion; and
a handle connected to the fixed portion at the internal pivot point, wherein the handle is also connected to the conveyance mechanism at a handle connection point located upstream from the pivot point.

16. The conveyor system of claim 14 wherein the conveyance mechanism comprises a conveyor.

17. The conveyor system of claim 14, wherein the conveyance mechanism comprises an auger.

18. The conveyor system of claim 16, wherein the hopper further comprises a hydraulic or electric actuation mechanism configured to, when actuated, move the hopper between the storage and deployed positions.

* * * * *